(12) United States Patent
Woodings

(10) Patent No.: US 7,459,898 B1
(45) Date of Patent: Dec. 2, 2008

(54) SYSTEM AND APPARATUS FOR DETECTING AND ANALYZING A FREQUENCY SPECTRUM

(76) Inventor: Ryan Woodings, 11819 W. Flintlock Dr., Boise, ID (US) 83713

( * ) Notice: Subject to any disclaimer, the term of this patent is extended or adjusted under 35 U.S.C. 154(b) by 45 days.

(21) Appl. No.: 11/605,839

(22) Filed: Nov. 28, 2006

Related U.S. Application Data

(60) Provisional application No. 60/809,324, filed on May 30, 2006, provisional application No. 60/740,067, filed on Nov. 28, 2005.

(51) Int. Cl.
G01R 23/00 (2006.01)
(52) U.S. Cl. .............. 324/76.19; 370/254; 370/342; 455/424; 455/425; 455/67.11
(58) Field of Classification Search ............... 324/76.19
See application file for complete search history.

(56) References Cited

U.S. PATENT DOCUMENTS

| | | | | |
|---|---|---|---|---|
| 6,313,874 B1 * | 11/2001 | Bowyer et al. | ............. | 348/180 |
| 6,778,519 B1 * | 8/2004 | Harrell et al. | ............. | 370/342 |
| 7,295,524 B1 * | 11/2007 | Gray et al. | ............. | 370/254 |
| 2004/0095381 A1 * | 5/2004 | McDowell | ............. | 345/740 |
| 2005/0113031 A1 * | 5/2005 | Turner et al. | ............. | 455/67.11 |
| 2005/0176420 A1 * | 8/2005 | Graves et al. | ............. | 455/424 |
| 2006/0063523 A1 * | 3/2006 | McFarland | ............. | 455/423 |
| 2007/0140424 A1 * | 6/2007 | Serceki | ............. | 378/62 |

OTHER PUBLICATIONS

Texas Instruments DBB03A, Baseband ASIC for Dolphin Chipset, Data sheet, SWRS030, Jul. 2005, pp. 1, 3.*
Cypress Semiconductor Corporation, CYWUSB6935 Wireless USB LR 2.4 GHz DSSS Radio SoC, Document # 38-16008 Rec *D, Revised Aug. 3, 2005, p. 1.*

* cited by examiner

Primary Examiner—Vincent Q Nguyen
Assistant Examiner—Benjamin M Baldridge
(74) Attorney, Agent, or Firm—Suiter Swantz pc llo

(57) ABSTRACT

An apparatus comprising a housing, a circuit board disposed within the housing, the circuit board further comprising a radio, a processing device, a memory, and a connector suitable for connecting with a port of a computing device. The circuit board is a small form factor circuit board, the radio is suitable for detecting a frequency spectrum and the processing device is suitable for transferring detected frequency spectrum data to the computing device via the connector and interfacing with a display to provide a manipulatable graphical user interface for analyzing the detected frequency spectrum data.

17 Claims, 14 Drawing Sheets

1500

SYSTEM AND APPARATUS FOR DETECTING AND ANALYZING A FREQUENCY SPECTRUM

CROSS REFERENCE TO RELATED APPLICATIONS

The present application claims the benefit under 35 U.S.C. § 119 of U.S. Provisional Application Ser. No. 60/740,067 filed Nov. 28, 2005 and U.S. Provisional Application Ser. No. 60/809,324 filed May 30, 2006. Said U.S. Provisional Application Ser. No. 60/740,067 filed Nov. 28, 2005 and U.S. Provisional Application Ser. No. 60/809,324 filed May 30, 2006 are hereby incorporated by reference in their entirety.

FIELD OF THE INVENTION

The present invention relates generally to the field of spectrum analyzers and more particularly to a highly mobile system and apparatus for detecting and analyzing a frequency spectrum.

BACKGROUND

In wireless networks, particularly short-range wireless networks such as IEEE 802.11 wireless local area networks (WLANs), the radio frequency band in which the wireless network operates is a frequency band that is shared with other wireless applications. For example, an IEEE 802.11 WLAN operates in either the 2.4 GHz unlicensed band or one of the 5 GHz unlicensed bands in the U.S. Other non-IEEE 802.11 WLAN devices operate in these frequency bands, including devices that operate in accordance with the Bluetooth® protocol in the 2.4 GHz band, cordless telephones in the 2.4 and 5 GHz bands, microwave ovens, infant monitors, radar, and the like. To the 802.11 WLAN devices, these other devices may be viewed as interferers. Some of these interferer devices transmit signals that hop to different center frequencies throughout the frequency band on a periodic or quasi-periodic basis. When transmissions of WLAN devices overlap in frequency and time with transmissions from interferer devices, the WLAN device may suffer partial, substantial or complete loss of signal, reduced signal quality or decreased throughput. Likewise, the interferer devices may suffer similar problems.

To reduce or eliminate interference with interferer devices, it is often desirable to ascertain where on the spectrum of available frequencies a device is operating. Typically, a spectrum analyzer is utilized to make this determination. A spectrum analyzer is essentially a receiver that is tuned or swept across a band of frequencies, and the amplitude of received signals is displayed on a display as a function of frequency. Conventional spectrum analyzers focus on features that enhance the accuracy of measurements, such as: sweep time, resolution bandwidth, and frequency range. These features often require specialized hardware. For instance, conventional spectrum analyzers typically contain dedicated hardware capable of quickly taking precise measurements. This specialized hardware is typically bulky and cost prohibitive for a small scale user, such as a small business, personal computer user or highly mobile technical support personnel.

Conventional spectrum analyzers also lack certain spectrum display and data manipulation features, creating additional work for a user desiring a particular spectrum display or spectrum data manipulation. For example, conventional spectrum analyzers typically graph amplitude versus frequency, requiring users to mentally map channels utilized by devices onto the frequency axis. Additionally, conventional spectrum analyzers do not provide the ability to save the measurement data for playback at a future time. Furthermore, while conventional spectrum analyzers allow an image to be saved, the image is generally only a representation of a single instant in time.

Consequently, it would be desirable to provide a system and method for portable analyzing and trouble shooting a frequency spectrum having enhanced graphical display and data manipulation features.

SUMMARY OF THE INVENTION

Accordingly, the various embodiments of the present invention are directed to a system and apparatus for troubleshooting and analyzing a frequency spectrum. System and apparatus may be suitable for detecting and analyzing wireless local area networks and wireless personal area networks. According to an embodiment of the present invention, an apparatus for detecting a frequency spectrum is disclosed. Apparatus may comprise a portable hardware device further comprising a 2.4 GHz radio and a Universal Serial Bus (USB) processing device. Apparatus may be suitable for communicating with a display generated by a software application utilized to display and analyze frequency spectrum data received from the portable hardware device via a graphical user interface.

According to an additional embodiment of the present invention, a system for detecting an analyzing a frequency spectrum is disclosed. System may comprise a portable hardware device further comprising a 2.4 GHz radio and a USB processing device. System may further comprise a display. Portable hardware device may communicate with the display and analyze frequency spectrum data received from the portable hardware device via a graphical user interface.

According to a further additional embodiment of the present invention, a method for detecting and analyzing a frequency spectrum is disclosed. Method may comprise providing a small form factor hardware device. The hardware device may comprise a radio, a processing device and a memory, and may be suitable for detecting frequency spectrum data. Method may detect and analyze frequency spectrum activity. Method may further comprise providing a display suitable for interfacing with the hardware device. Method may also comprise displaying the detected frequency spectrum activity on a graphical user interface.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
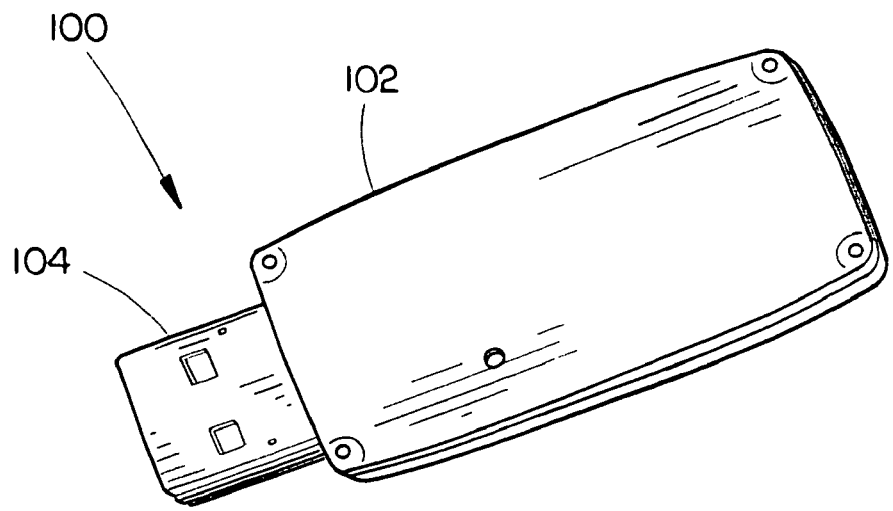
FIG. 1 is a perspective view of an apparatus for detecting and analyzing a frequency spectrum in accordance with an exemplary embodiment of the present invention.

Referring to FIG. 1, a perspective view of an apparatus 100 for detecting and analyzing a frequency spectrum in accordance with an exemplary embodiment of the present invention is shown. Apparatus 100 may be a physical device suitable for attaching to a computing device I/O port and adding hardware capabilities. For instance, apparatus may be a hardware device suitable for insertion into a parallel or a USB port of a computing device. Apparatus 100 may comprise a housing 102 suitable for encasing device circuitry. Apparatus 100 may further comprise a connector 104 such as a USB interface which may allow a connection with virtually all modern computers employing a Microsoft® Windows 2000®, Windows XP® or later Microsoft® operating system, or Microsoft® .Net framework. To accomplish interconnection, one end of the apparatus 100 may be fitted with the connector 104. In one embodiment, connector 104 may be a single male type-A USB connector. However, apparatus 100 may be configured to interface with any notebook or desktop PC with USB 2.0 or 1.1 ports, or any other port suitable for interfacing with a peripheral hardware device.

It is contemplated that housing 102 may encase apparatus circuitry alone or apparatus circuitry and connector 104. Housing 102 may be two components, one housing component permanently or releasably housing device circuitry, and one component such as a cap suitable for releasably housing the connector 104. Releasable connector housing may provide protection for a connector 104 when a device is not inserted into a port. In an additional embodiment, connector 104 may be retractable, and may be retracted into housing when not inserted into a port. Housing 102 may further comprise a built-in attachment assembly such as a loop suitable for attaching a lanyard or other such wearable or graspable assembly suitable for allowing wearing or grasping of the apparatus 100 or more easily locating the apparatus 100.

Figure 2:
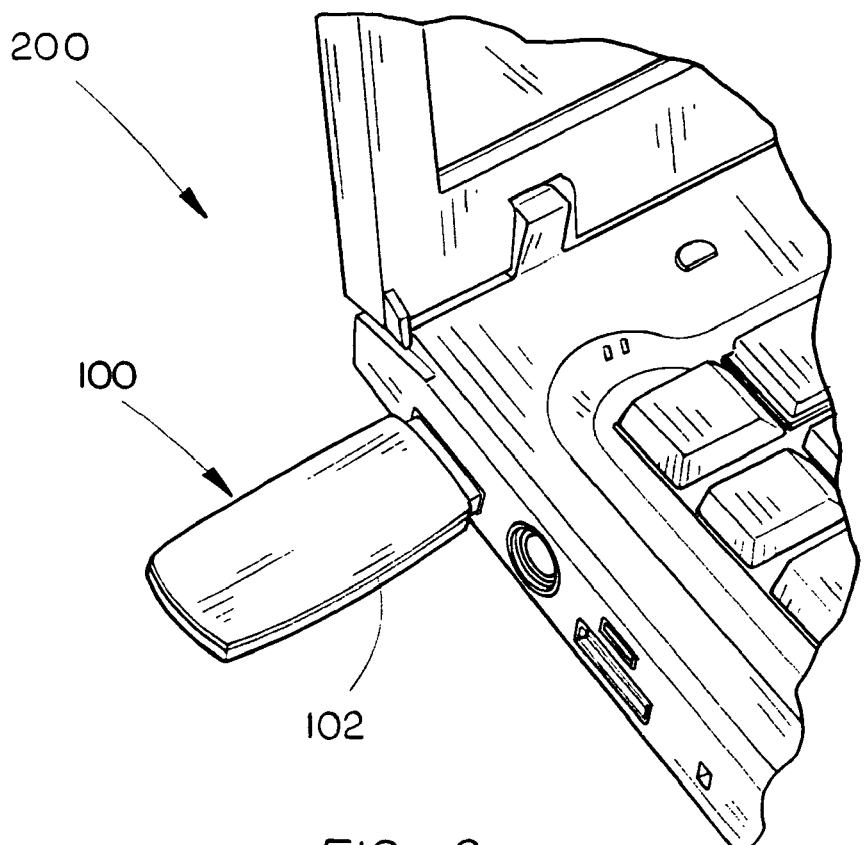
FIG. 2 is a perspective view of an apparatus for detecting and analyzing a frequency spectrum in accordance with an exemplary embodiment of the present invention engaged with a computing device.

Referring to FIG. 2, perspective view 200 of an apparatus 100 for detecting and analyzing a frequency spectrum in accordance with an exemplary embodiment of the present invention is shown engaged with a computing device. In the embodiment illustrated, connector 104 is a single male type-A USB connector suitable for providing an interface to a computing device USB port. In one embodiment, connection is a USB 1.1 or 2.0 connection. Apparatus 100 may be formed within a very small form factor and weigh approximately 8.5 grams.

Figure 3:
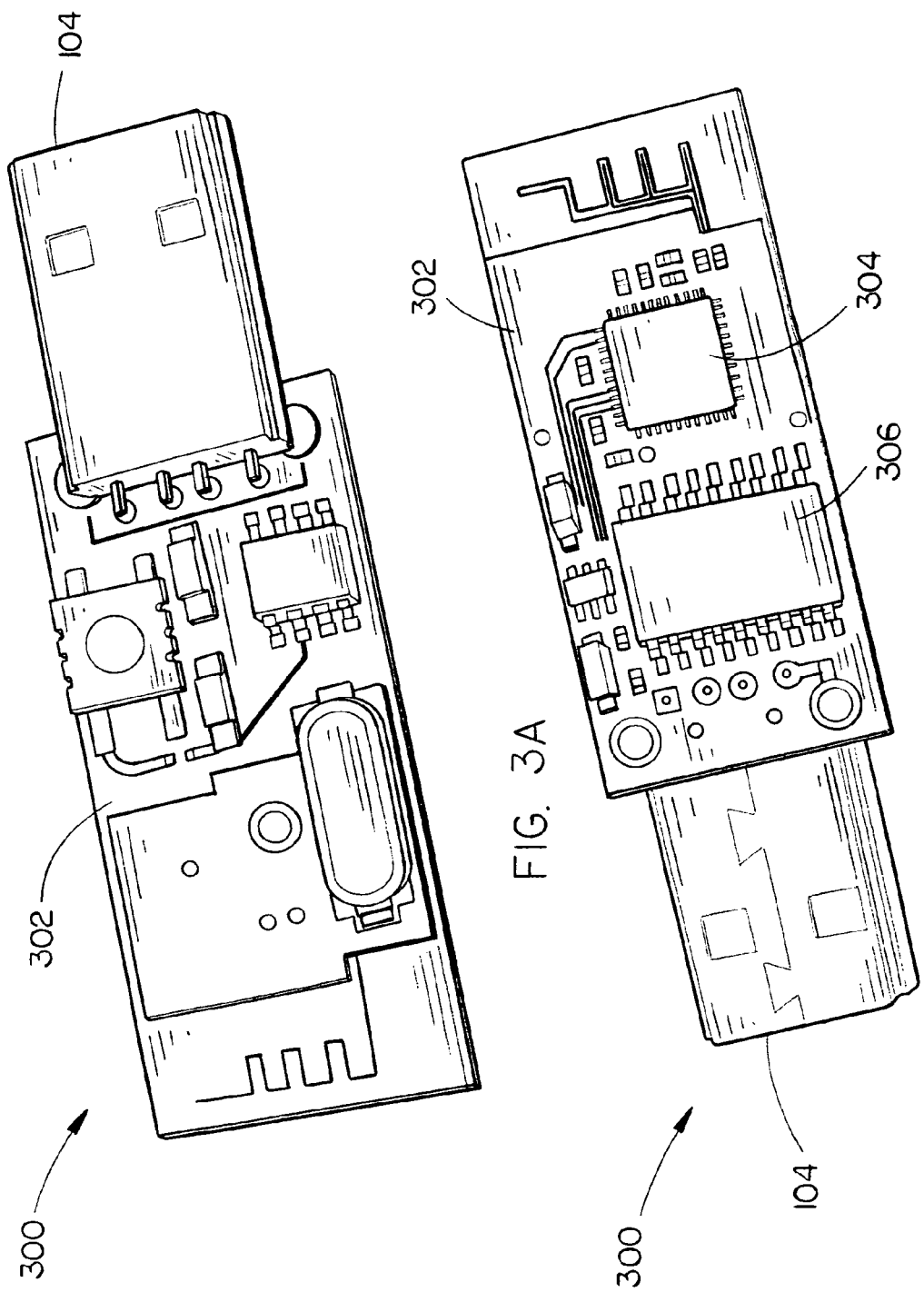
FIGS. 3A and 3B are perspective views of the components of an apparatus for detecting and analyzing a frequency spectrum in accordance with an exemplary embodiment of the present invention.

Referring to FIGS. 3A and 3B, perspective views of the device circuitry 300 of an apparatus 100 for detecting and analyzing a frequency spectrum in accordance with an exemplary embodiment of the present invention are shown. Device circuitry 300 may be assembled on a small printed circuit board 302. Mounted on this circuit board 302 may be power circuitry and a small number of surface-mounted integrated circuits. Device circuitry 300 may be comprised of an ODM of memory, a DC-DC power converter, and wired and wireless communication. In one embodiment, device circuitry 300 may comprise a 2.4 GHz radio 304, and a processing device 306. Device circuitry 300 may further comprise an interface to a port such as a USB port.

Radio 304 may be a 2.4 GHz DSSS radio system on a chip (SoC) integrated circuit. In one embodiment, radio 304 may be a single-chip 2.4 GHz DSSS Gaussian Frequency Shift Keying (GFSK) baseband modem connected directly to a controller such as a USB controller or any standard processing device. Radio 304 may be a receiver only or transceiver integrated circuit comprising a 28-pin SOIC package alone or a 28-pin SOIC package and a small footprint 48-pin QFN package. Radio and modem may be frequency-agile. The receiver and transmitter of the radio 304 may be single-conversion low-intermediate frequency (IF) architecture with fully integrated IF channel matched filters to achieve high performance in the presence of interference. An integrated power amplifier may provide an output power control range of 30 dB in seven steps. Receiver and transmitter may further comprise an integrated voltage controlled oscillator (VCO) and synthesizer suitable for covering a complete 2.4 GHz GFSK radio transmitter ISM band. It is contemplated that a VCO loop filter may also be integrated on-chip.

Processing device 306 may be a processing device such as a highly integrated chip comprising a CPU, RAM, some form of ROM, I/O ports, and timers. Processing device 306 may comprise a small reduced instruction set computer (RISC) microprocessor and a small amount of on-chip ROM and RAM. Controller 306 may be hot-swappable, non-volatile, solid-state device and may be compatible with any system supporting the USB version a drive utilizes. Processing device 306 may be a low-speed USB and PS/2 peripheral controller suitable for USB and PS/2 operations. In one embodiment, radio may have a receive sensitivity of −90 dBm.

Apparatus 100 may further comprise memory data storage such as a USB flash drive or other such NAND-type flash memory data storage device. Measurement data may be stored on the memory data storage. Memory data storage may be rewritable and have memory capacity ranging from 128 megabytes up to 64 gigabytes. It is contemplated that memory may be limited only by current flash memory densities, and may increase as memory technology develops.

Apparatus 100 may be suitable for communicating with a software application utilized to analyze and generate a display for displaying the spectrum analysis data received from the apparatus 100. It is further contemplated, however, that the apparatus 100 may be fully self-contained, and further comprise adequate memory to hold the display generating software application. For instance, the apparatus 100 may further comprise a storage device containing the software application. Software application may allow apparatus programming to automatically run when connected to a computer via an interface. In one embodiment, storage device may be a USB portable storage device and interface may be a USB interface.

Figure 4:
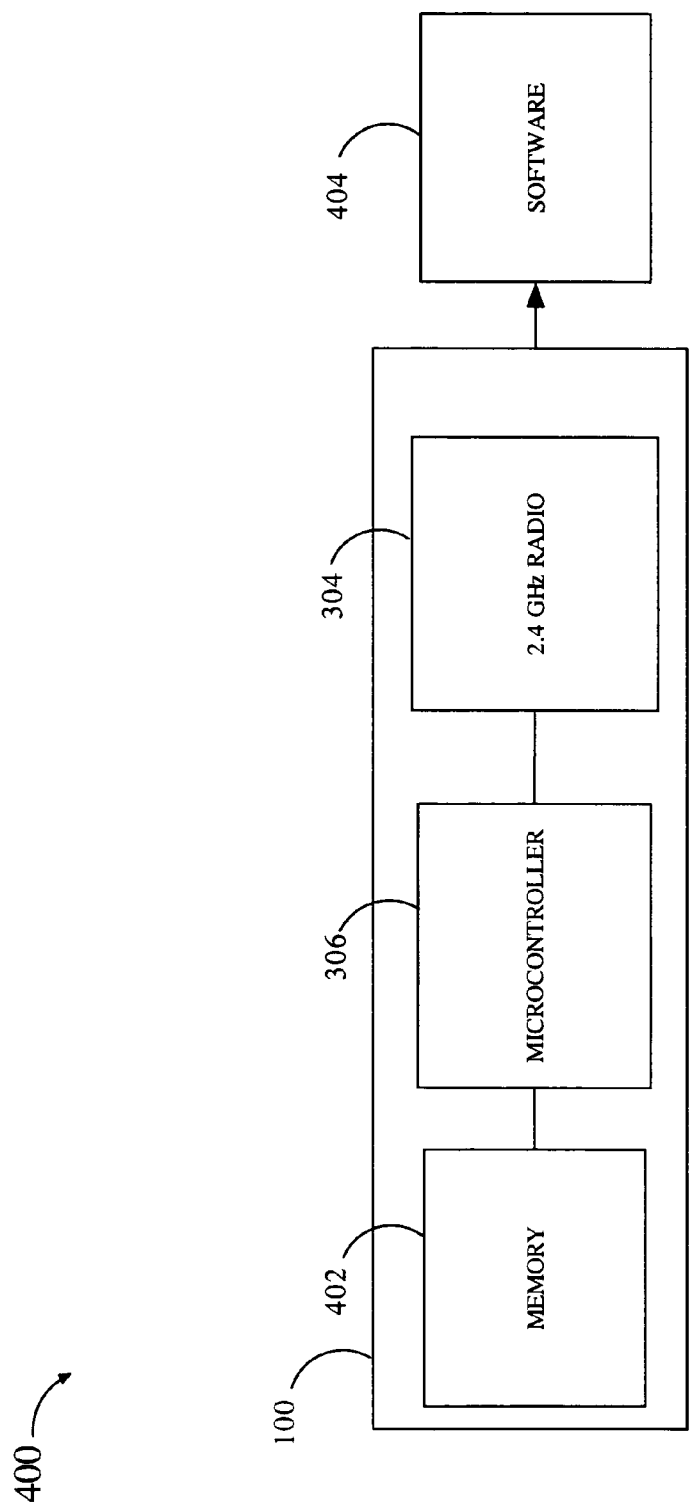
FIG. 4 is a block diagram of a system in accordance with an exemplary embodiment of the present invention.

Referring to FIG. 4, a block diagram of a system 400 in accordance with an exemplary embodiment of the present invention is shown. System 400 may comprise a hardware component 100 further comprising a 2.4 GHz radio 304, a processing device 306 and a memory 402. System 400 may also comprise a display generated by a software application 404 suitable for communicating with the apparatus 100. System 400 may detect and display a frequency spectrum on a computing device via a graphical user interface (GUI) display. In one embodiment, system may detect a frequency within the 2.400 to 2.484 GHz range have an amplitude range of −45 to −95 dBm, a +/−5 dBm accuracy, a 100 msec sweep time and a 1 MHz resolution bandwidth. System 400 may be suitable for troubleshooting and analyzing wireless 2.4 GHz networks such as the 802.11b, the 802.11g and the 802.11n networks. System 400 may be manufactured with a small form factor and low cost. System 400 may also comprise a consumer radio capable of measuring signal strength on a discrete number of frequencies.

Figure 5:
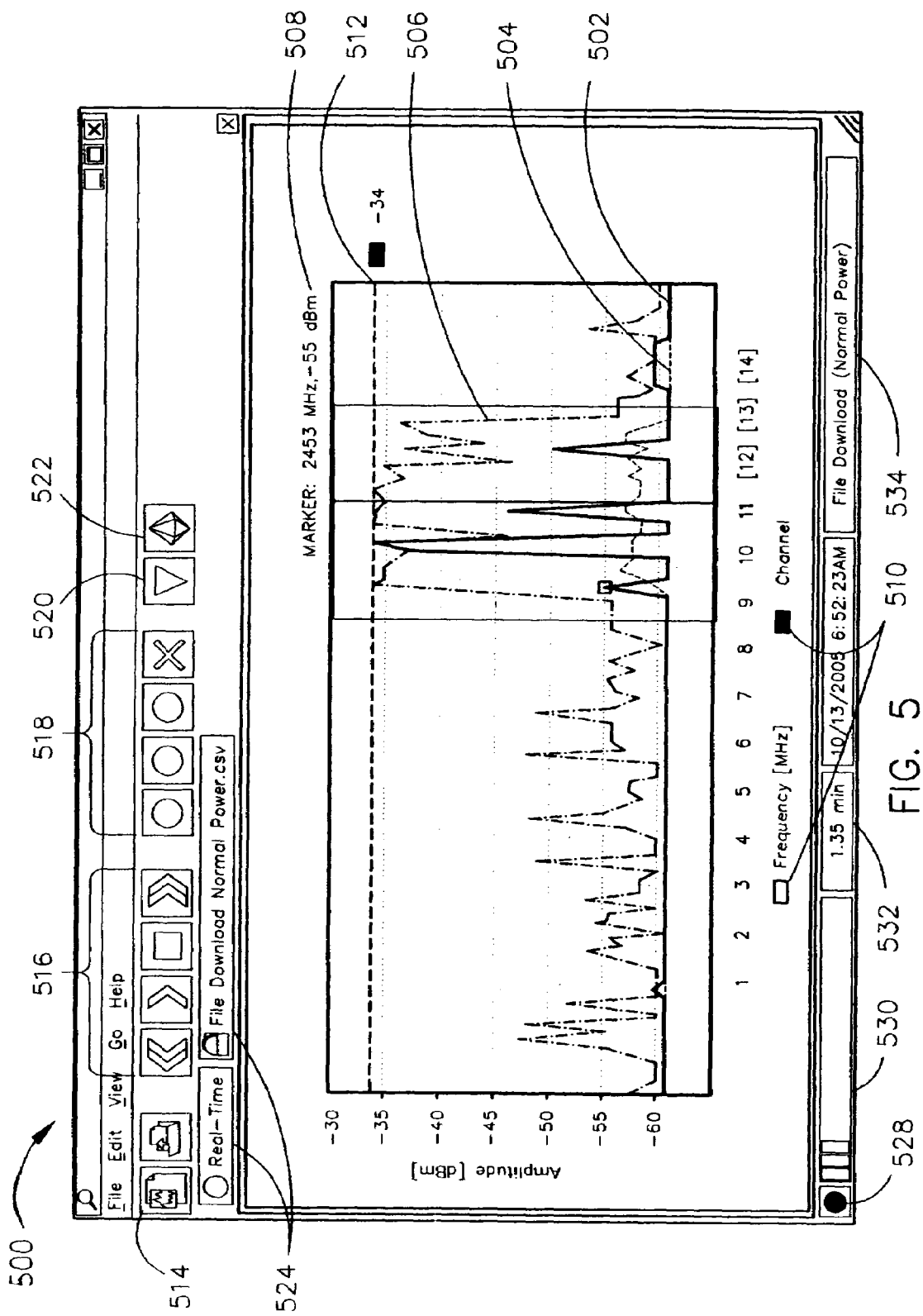
FIG. 5 is an illustration of a graphical user interface utilized for analyzing detected frequency spectrum data in accordance with an exemplary embodiment of the present invention.

Referring to FIG. 5, an illustration of a graphical user interface 500 utilized for analyzing detected frequency spectrum data in a system 400 in accordance with an exemplary embodiment of the present invention is shown. System 400 may be suitable for detecting a frequency spectrum and graphical user interface may be capable of graphically displaying a data trace 502, an average trace 504, and a maximum trace 506. Graphical user interface 500 may also comprise a frequency and amplitude marker 508, a frequency or channel view selector 510, and a high amplitude line 512. A trace marker may be disabled or enabled for or any of the traces from the toolbar, the View menu, keyboard shortcut and the like. A trace may be reset via a reset icon. If a marker is enabled, the frequency and amplitude of the current position may be displayed at the top right corner of the graph. Additional functions may be provided to enhance display and analysis. For instance, mousing over a channel number may highlight the frequency band on the data display, and clicking the channel number may highlight the frequency band.

Graphical user interface 500 may be suitable for recording, saving and replaying a data trace, comparing traces, and displaying wireless network channel boundaries. For instance, graphical user interface 500 may comprise a record selector 514, playback controls 516, active trace controls 518, marker control 520, a maximum amplitude line selector 522, screen tabs 524 suitable for toggling between two or more screens, a data point marker 526, an enumeration indicator 528, a recorded data position 530 and time stamp 532, and a recorded data description 534. A generated frequency spectrum graph may be saved in any format. The color scheme and keyboard shortcuts may be modified or edited from the menu.

Figure 6:
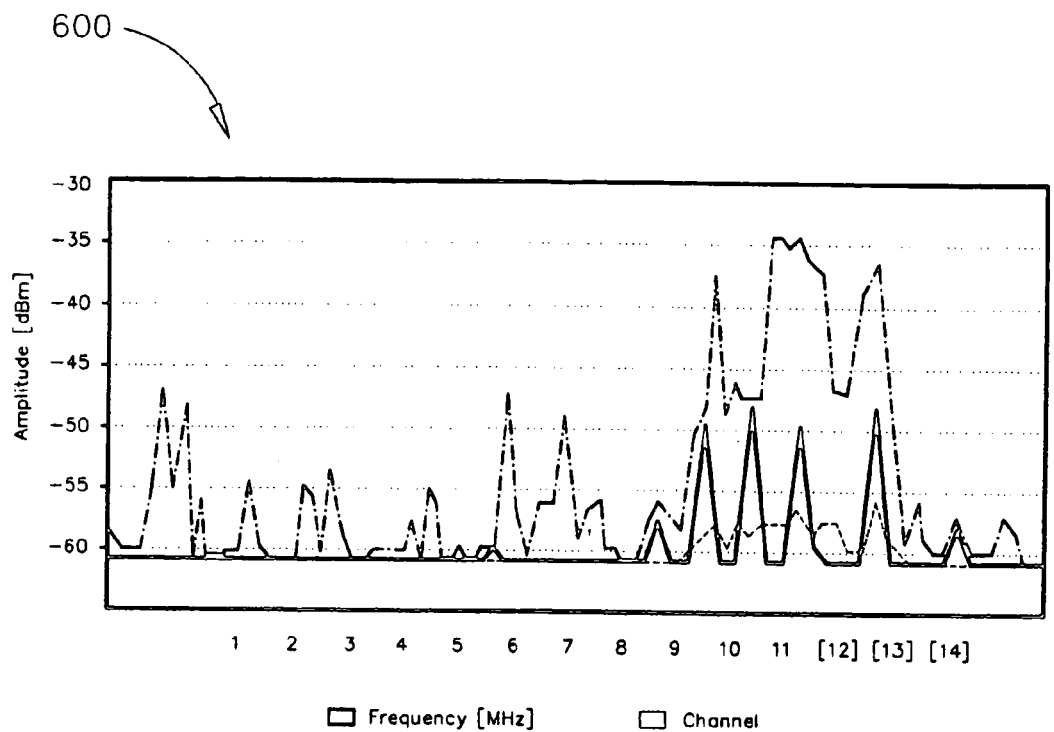
FIG. 6 is an illustration of an analysis of detected frequency spectrum data in accordance with an exemplary embodiment of the present invention whereby amplitude is graphed versus channel.
Figure 7:
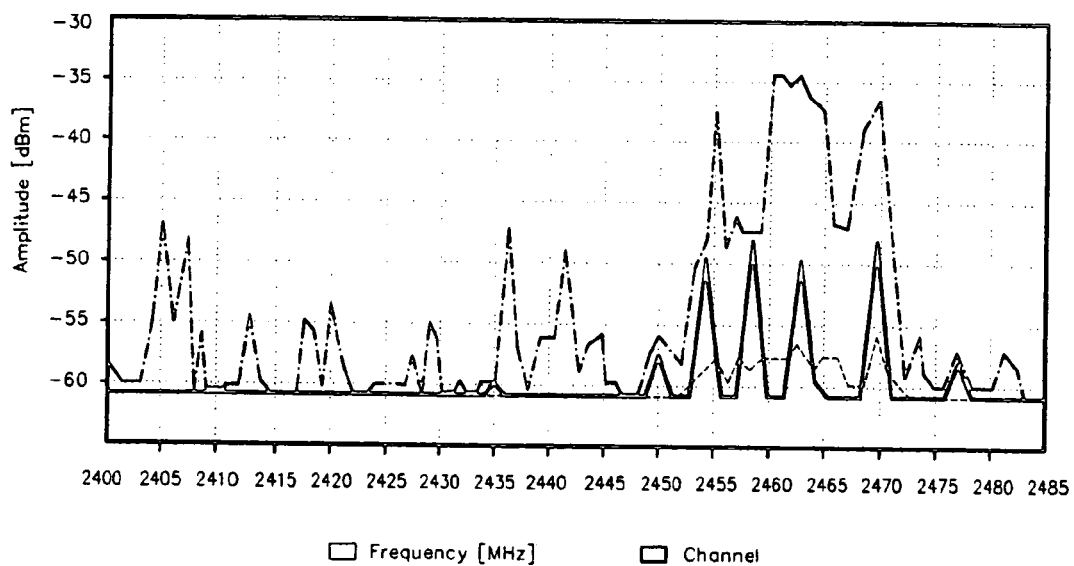
FIG. 7 is an illustration of an analysis of detected frequency spectrum data in accordance with an exemplary embodiment of the present invention whereby amplitude is graphed versus frequency.

A graphical user interface 500 in accordance with an embodiment of the present invention may graph and display amplitude versus frequency as well as amplitude versus channel. Referring to FIG. 6, an illustration 600 of an analysis of detected frequency spectrum data in accordance with an exemplary embodiment of the present invention whereby amplitude is graphed versus channel is shown. Referring to FIG. 7, an illustration 700 of an analysis of detected frequency spectrum data in accordance with an exemplary embodiment of the present invention whereby amplitude is graphed versus frequency is shown. The view may be changed from Frequency View to Channel View. For example, system 400 GUI may provide a toggle function, allowing a user to toggle between an amplitude versus channel view and an amplitude versus frequency view. In Frequency View the horizontal axis of the data display is labeled with frequency in MHz. In Channel View the horizontal axis is labeled with the wireless channel numbers centered at the midpoint of each channels frequency range.

Channels may be of any frequency width. For example, Wi-Fi® channels are typically 22 MHz wide, and ZigBee® channels are typically 3 MHz wide. Wi-Fi® may refer to any of the three established standards 802.11b, 802.11a and 802.11g for wireless LAN (WLAN) communication. ZigBee® may refer to a published specification set of high level communication protocols designed to use small, low power digital radios based on the IEEE 802.15.4 standard for wireless personal area networks (WPANs). The relationship between IEEE 802.15.4 and ZigBee® is analogous to that existing between IEEE 802.11 and the Wi-Fi® Alliance. It is contemplated that system 400 may detect any frequency suitable for providing short-range, high data rate connections between mobile data devices and access points connected to a wired network.

Figure 8:
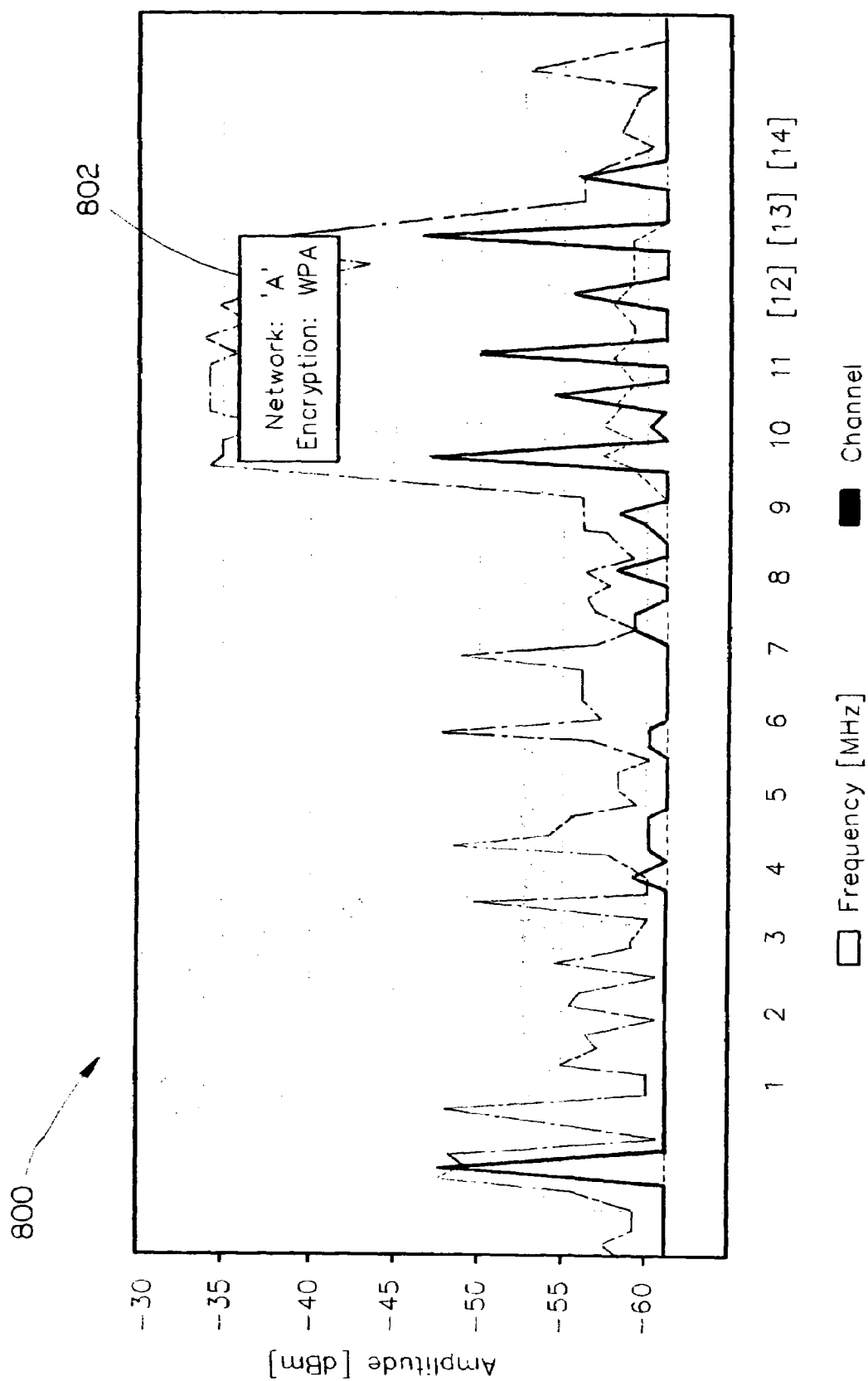
FIG. 8 is an illustration of an analysis of detected frequency spectrum data in accordance with an exemplary embodiment of the present invention integrated with a wireless network detector.

Referring to FIG. 8, an illustration 800 of an analysis of detected frequency spectrum data in accordance with an exemplary embodiment of the present invention integrated with a wireless network detector. System 400 may be suitable for implementation with a wireless network detector. A wireless network detector may refer to a detector suitable for providing information about an available network, such as security type, signal strength, and network name. For instance, system 400 may be suitable for integration with a wireless network detector such as Netstumbler® for Windows®, Kismet for Linux® or the like, which utilize radios such as Wi-Fi® radios to monitor network traffic and provide network information. Information from a wireless network detector may be overlaid with detected frequency spectrum data to display where an individual network 802 may be located in the spectrum. A user may quickly pinpoint signals that may be transmitted from rogue devices or signals that are interfering with a network. System 400 may be capable of integrating the network and spectrum analysis into a single device and integrate the software together by combining a wireless chipset with the apparatus hardware.

Figure 9:
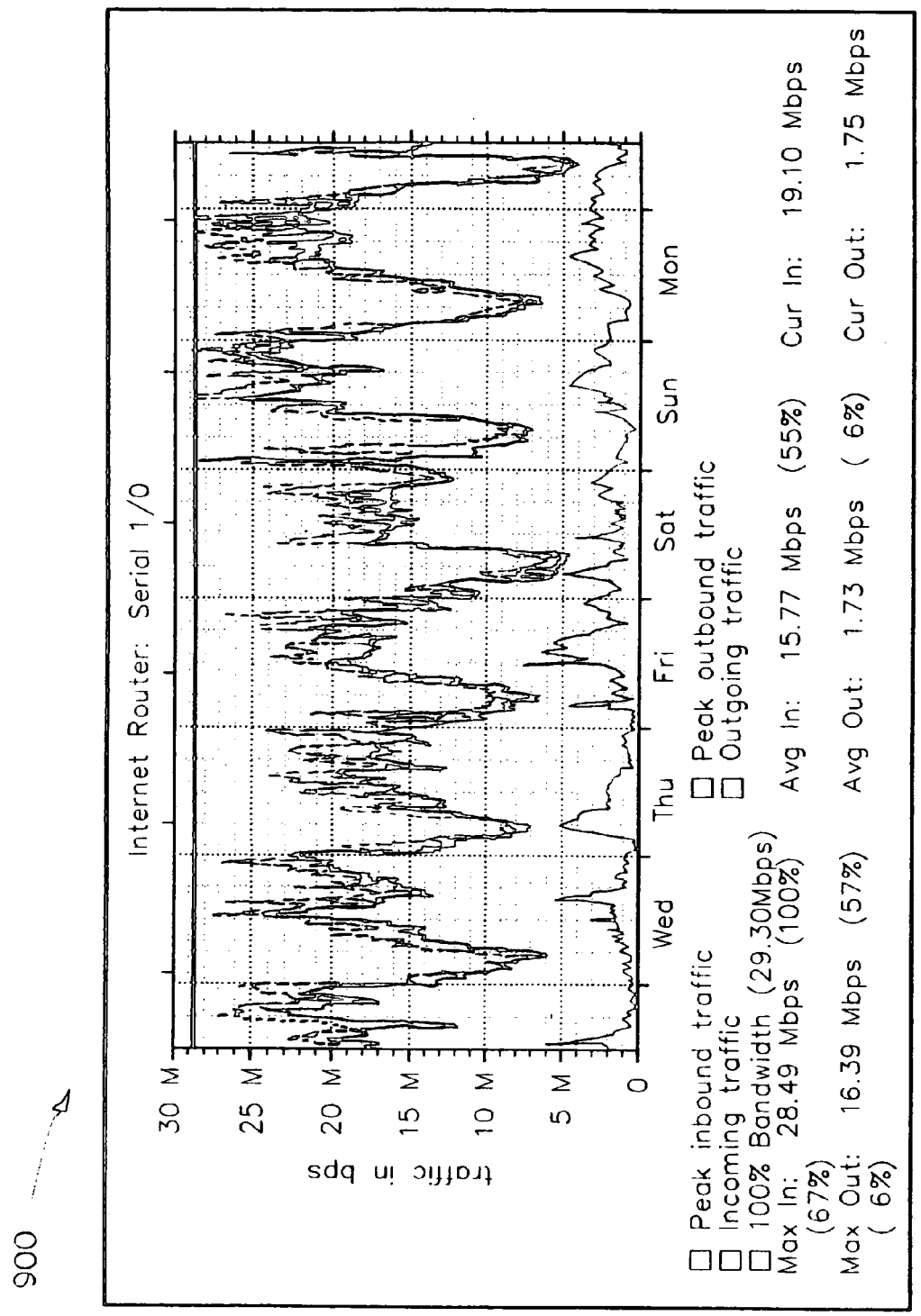
FIG. 9 is an illustration of a router activity graph created by a system in accordance with an exemplary embodiment of the present invention.

Referring to FIG. 9, an illustration of a router activity graph 900 created by a system in accordance with an exemplary embodiment of the present invention is shown. System 400 may also comprise an activity log suitable for logging data concerning the traffic that goes through the device. Network administrators or other such personnel may analyze this data to help optimize their networks. The system 400 may provide similar types of logs that show the average, minimum, maximum or the like signal strength across a spectrum for a given hour of the day, a given day of the week, a specific day, and the like. Log may be utilized to determine when interference typically occurs, when wireless networks are used the most, and the like.

System 400 may also be suitable for setting triggers based on a wireless channel to detect rogue access points. Triggers may be set to alert a user if certain frequencies sustain a certain level of signal strength over a certain period of time. A trigger and alert may be capable of warning of possible rogue devices in the area, or of excessive traffic on a given access point or network. Alerts may be a pop-up message, email, SMS, etc. SMS may refer to the Short Message Service, available on digital GSM networks allowing text messages of up to 160 characters to be sent and received via the network operator's message center to a communication device such as a cellular phone, or from the Internet, using an SMS gateway website. If the communication device is powered off or out of range, messages may be stored in the network and delivered at a subsequent opportunity.

System 400 may be suitable for recording data traces over a time period. Recorded data traces may be replayed to analyze a data trace over the time period. Data trace may be rewound, fast forwarded, paused and the like to enable a user to locate and analyze a desired segment of the data trace. Data can also be recorded as a text file and replayed at a later time. An entire data trace may be saved, or a portion of a data trace may be selected and saved separately. For instance, a data trace that runs for 24 hours may comprise a section of relatively high activity, such as 12:00 PM. Section may be selected and saved for comparison, for example to a section recorded in a subsequent data trace occurring at 12:00 PM the following day. The spectrum analyzer has several options to save the data for further analysis or presentation. Static images of the data viewing window may be created and display, or actual data may be recorded for playback later. System 400 may further comprise the options to save, print or copy an image to a clipboard, vary a color scheme, and install to hard drive or run from CD. Recorded files may be opened in a new tab, and a user may toggle back and forth between tabs to compare data traces.

It is contemplated that system display generating software application may be implemented in the form of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions. In one embodiment, system software may be included on a CD-ROM, or may be downloadable from a website. The system 400 may utilize Microsoft's .Net framework in order to run. There may be at least two versions of the system 400 available for download, one full installer that will also install the .Net framework, and a standalone installer for devices with the .Net framework already installed. The system 400 may run directly from the CD without installing anything in a Windows Registry. This option may be useful if a user is troubleshooting someone else's network and are not utilizing the system 400 on the user's own machine. The software may also be copied to removable USB storage media if desired.

Figure 10:
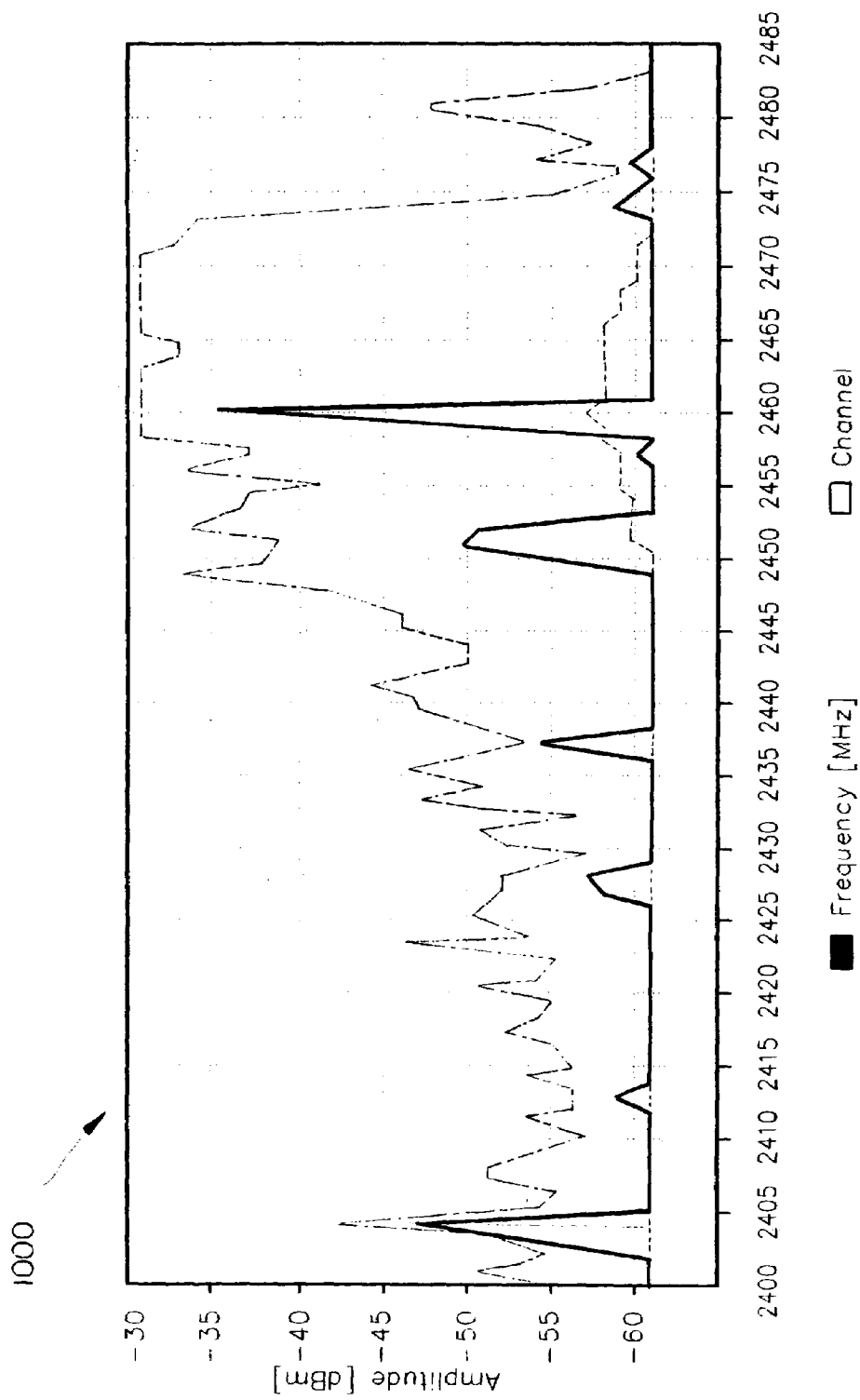
FIG. 10 is an illustration of a signal generated by a microwave oven provided by a system in accordance with an exemplary embodiment of the present invention.
Figure 11:
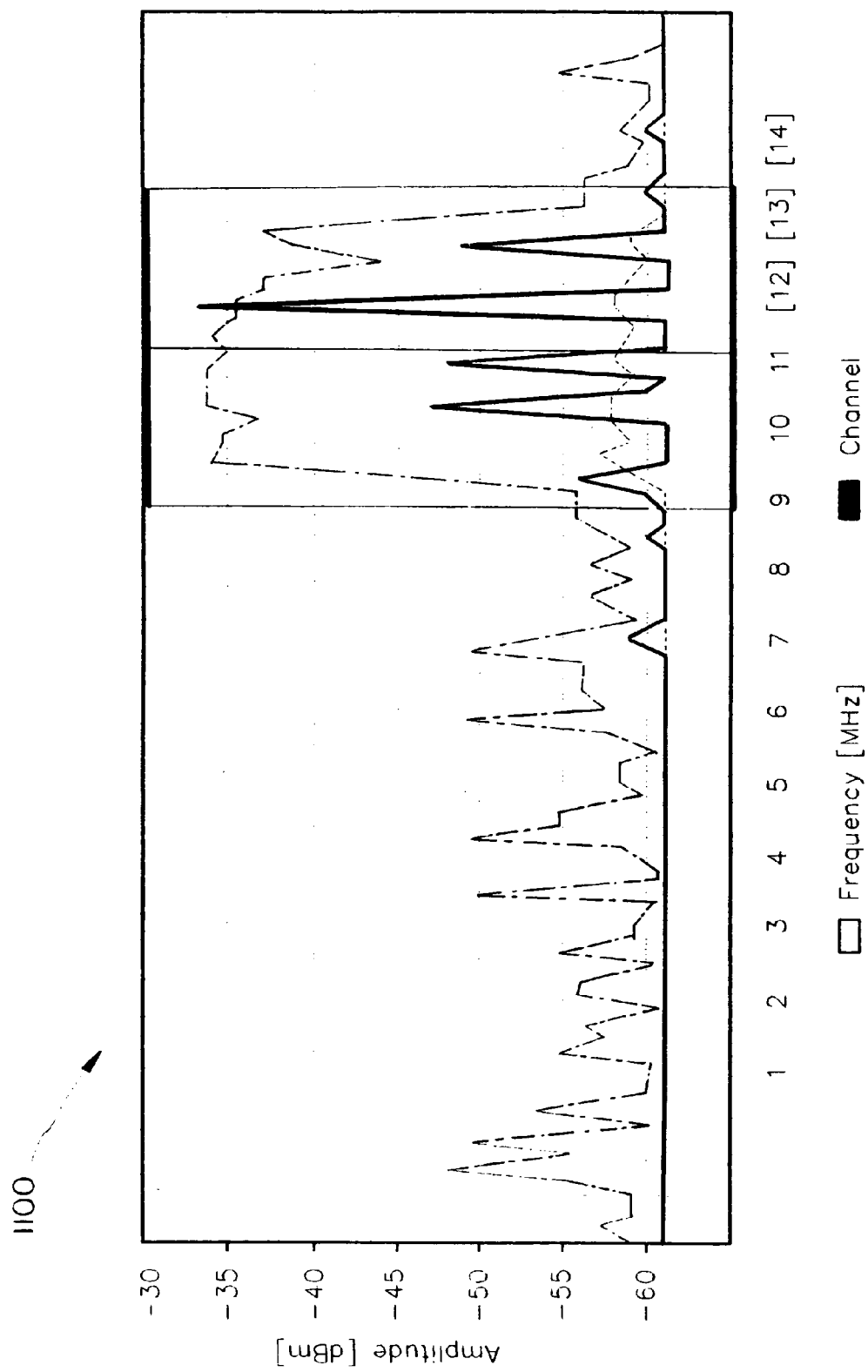
FIG. 11 is an illustration of a signal generated by a wireless network provided by a system in accordance with an exemplary embodiment of the present invention.
Figure 12:
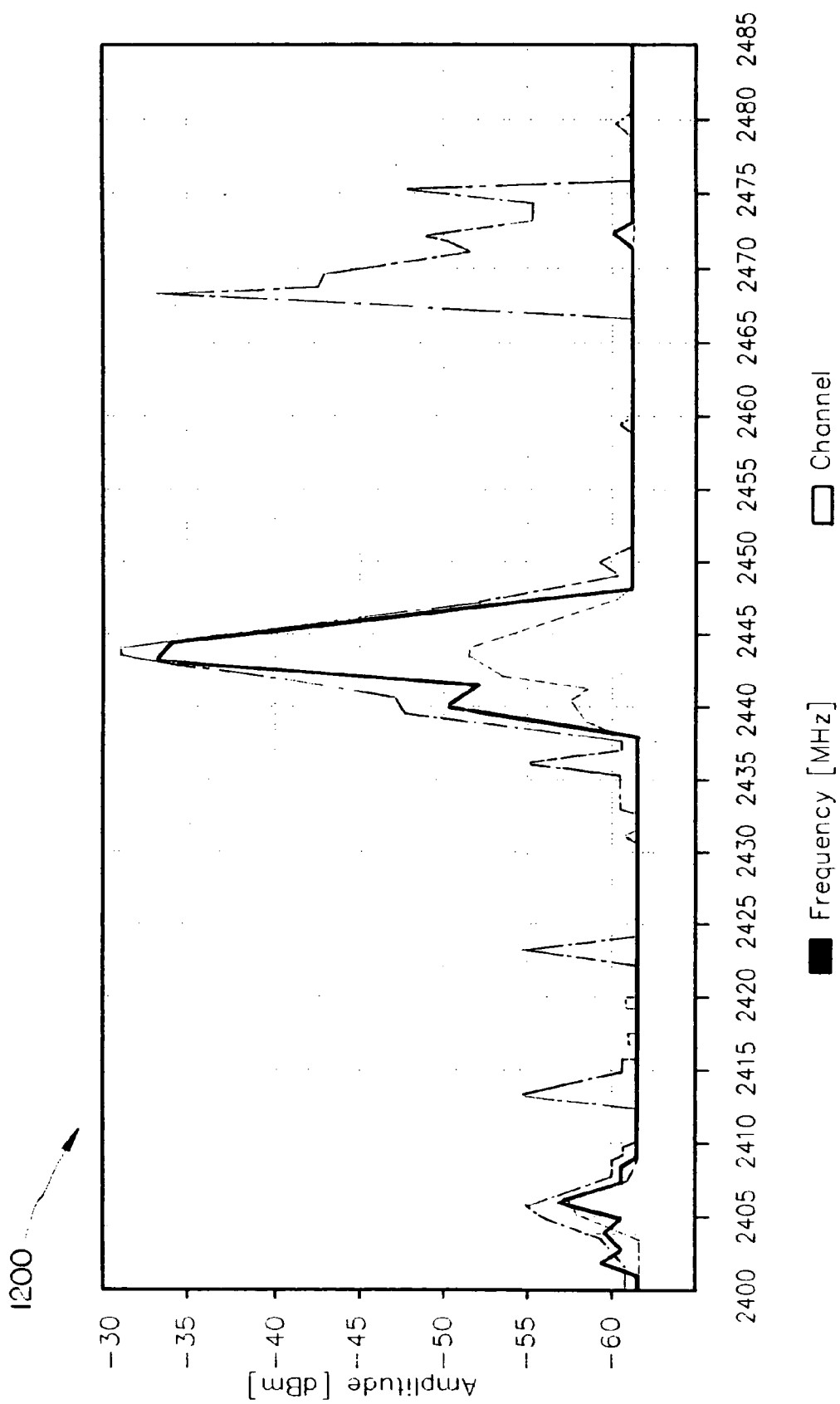
FIG. 12 is an illustration of a signal generated by a wireless telephone provided by a system in accordance with an exemplary embodiment of the present invention.

System 400 may comprise a database of signals generated by a plurality of devices and networks. There are numerous devices that operate in the 2.4 GHz band and many different communication protocols are used. Most electronic devices that contribute interference in the 2.4 GHz frequency band have a recognizable signature. By creating an online database of RF traffic recordings of various devices, recordings of unknown devices could be easily compared to existing recordings to determine possible device type matches. This comparison could either be done manually or automatically by a software program. Prerecorded samples the signals generated by 2.4 GHz devices may be included in the program file directory. Signal database may comprise a collection of signals from a 2.4 GHz cordless phone, a microwave oven, a wireless file transfer, wireless streaming audio, Bluetooth signals, or any signal known to generate interference in the 2.4 GHz bandwidth. Referring to FIG. 10, an illustration of a signal 1000 generated by a microwave oven provided by a system in accordance with an exemplary embodiment of the present invention is shown. As illustrated, microwave ovens typically cause heavy interference across the top half of the 2.4 GHz band, with mild interference across the bottom half of the band. Referring to FIG. 11, an illustration of a signal 1100 generated by a wireless network provided by a system in accordance with an exemplary embodiment of the present invention is shown. As illustrated in FIG. 11, an active wireless network may generate a signal approximately 22 MHz in a bell-shaped pattern as shown below. The data trace may typically comprise 1-5 narrow peaks spread across the 22 MHz signal. Referring to FIG. 12, an illustration 1200 of a signal generated by a wireless telephone provided by a system in accordance with an exemplary embodiment of the present invention is shown. There currently is not a standard technology for 2.4 GHz cordless communication devices. As a result, communication devices manufactured by different companies, and sometimes communication devices manufactured by the same company, may behave very differently. FIG. 12 shows a signal from one type of 2.4 GHz cordless phone. As illustrated in FIG. 12, this phone hops frequencies quickly to spread its signal across the entire band over a short period of time.

To display a pre-recorded signal sample, a user may select "Open Recording . . . " from the File menu and then select the desired sample. Recordings may play in individual tabs, allowing a user to compare recordings to each other and to a real-time trace. Comparing recordings of the common 2.4 GHz devices may assist with identifying the types of devices operating in an environment.

Figure 13:
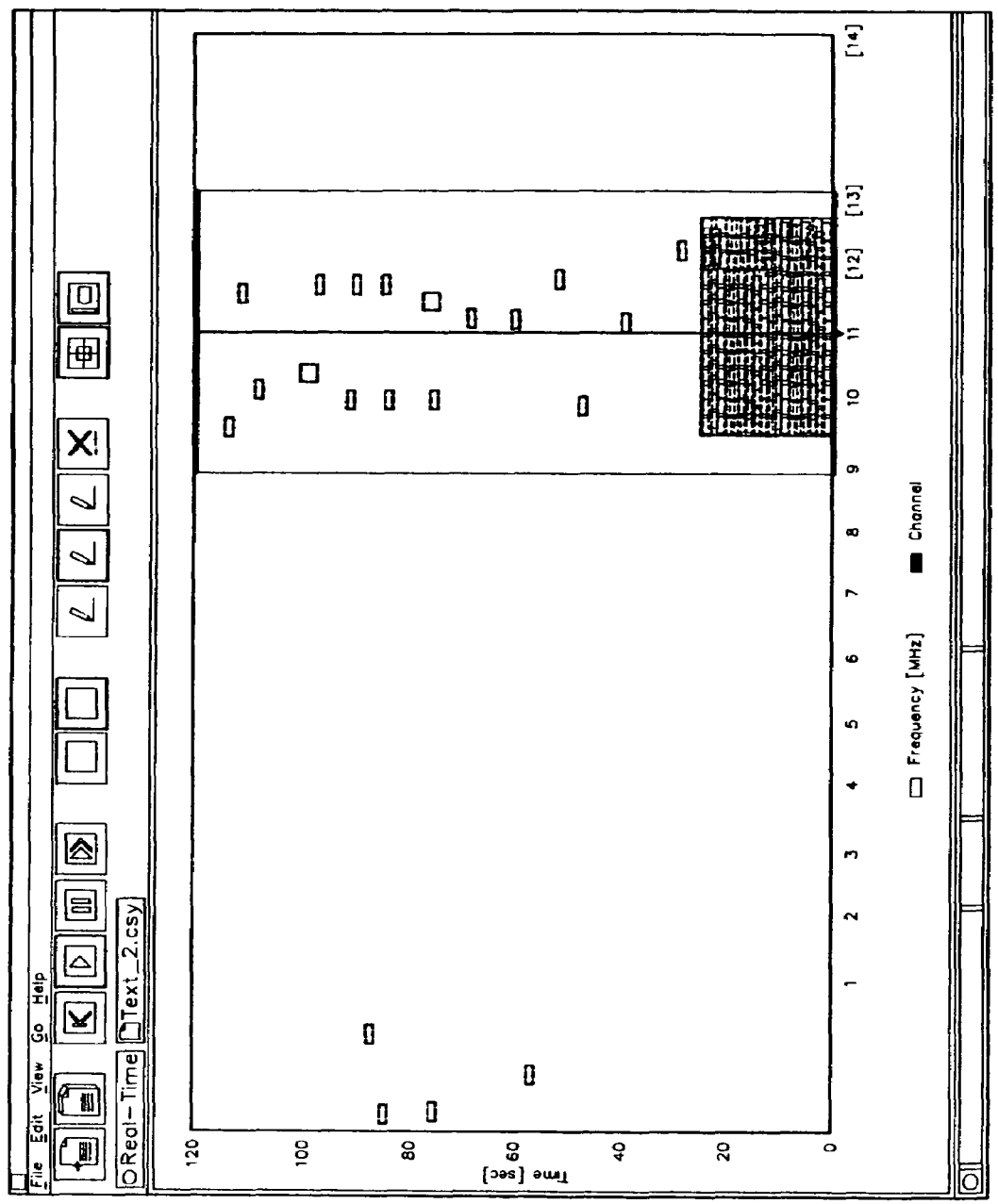
FIG. 13 is an illustration of a screen print of a spectrograph generated by a system in accordance with an exemplary embodiment of the present invention.

Spectrum analysis data may be useful for troubleshooting and optimizing wireless networks by identifying interference, low signal strength, and other issues. Continuous observation and analysis is ideal in that all interference may then be detected. However, it may not be cost-effective or time effective to constantly or near constantly monitor a spectrum analyzer display to identify interference. Therefore it may be desirable to record the spectrum analysis data for future playback and analysis. Automatic recording of data may be separated into discrete time segments, such as hourly segments, daily segments, and the like for later review analysis. Referring to FIG. 13, an illustration of a spectrograph 1300 generated by a system in accordance with an exemplary embodiment of the present invention is shown. The software may display a spectrogram view of the entire file, which may be segmented, scrolled through or otherwise manipulated. For instance, spectrogram view may display an entire recording of a 24 hour period, hourly period and the like. System 400 may provide a zoom time scale function to zoom in an out of a displayed recording to analyze specific time periods. In one embodiment, the time axis may be adjusted to allow a user to zoom in/out to view and analyze the spectrum at certain time periods within the file. If the time is zoomed out, a "magnified" view of the spectrogram with a higher resolution of the time scale may also be displayed so that the user does not have to zoom in/out for each section of user interest. System spectrograph display may also provide a bookmark function to bookmark new devices, triggers, activity and the like in a recorded spectrum. Additionally, a recording may be replayed from specific time point, by, for example, double clicking in the spectrogram view to start playback. Alerts, device identification, and other information may be bookmarked in the file to allow the user to quickly jump to specific sections of the file. If a device is identified, system may provide a visual indication of the time period the device was active. For instance, display may be a bar or bracket showing beginning and ending time of the device activity. A user may mouse over the spectrogram view and additional information about that point in the file can be displayed such as time, frequency, and amplitude.

Figure 14:
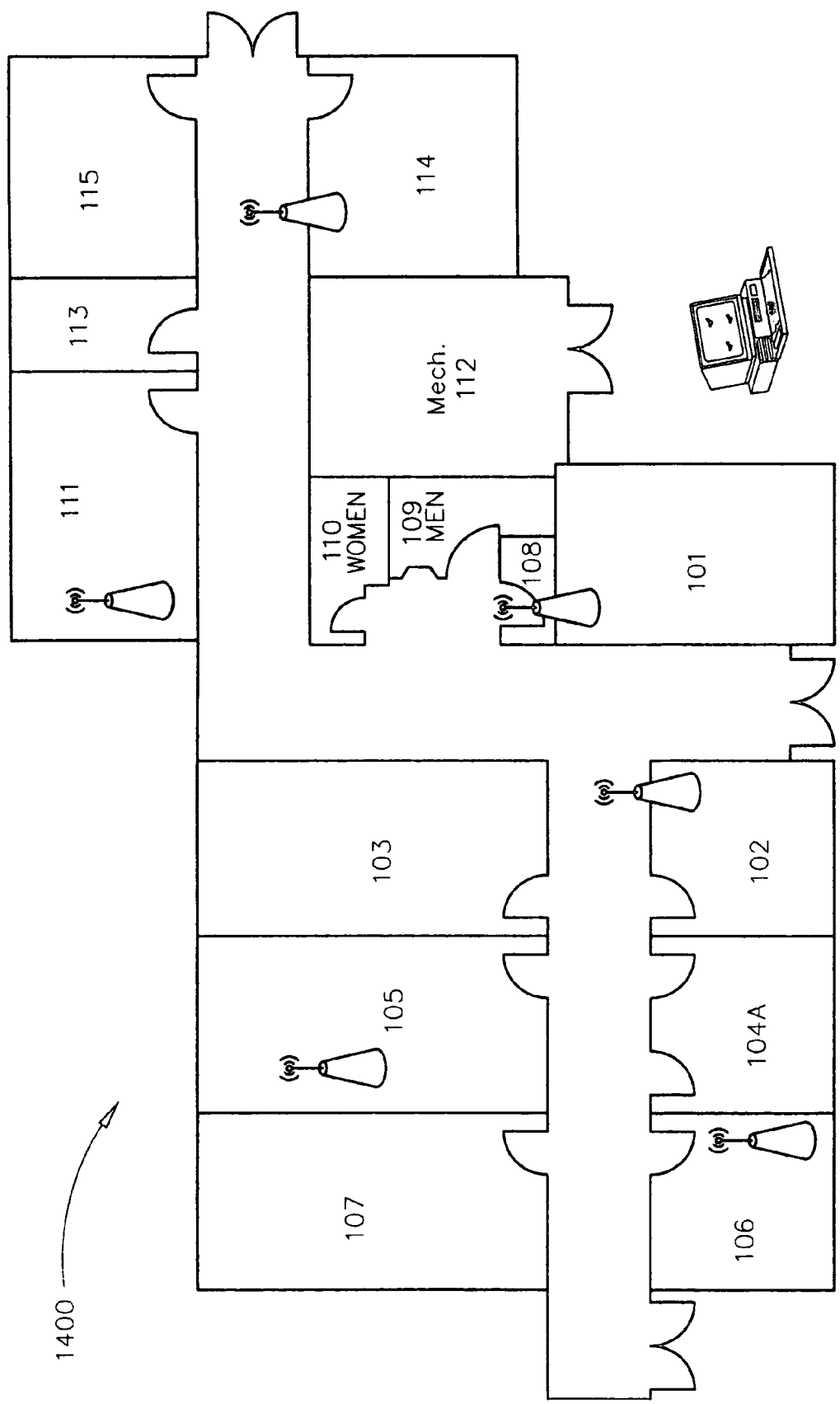
FIG. 14 is an illustration of a system employing multiple apparatuses in an office environment in accordance with an exemplary embodiment of the present invention.

A system 400 in accordance with an embodiment of the present invention may be constructed as a standalone unit suitable for connecting into the network via Ethernet, a wireless network, or like network media. Stand alone unit may provide a system 400 suitable for moveable placement in an area, such as throughout an office. Referring to FIG. 14, an illustration 1400 of a system employing multiple apparatuses in an office environment in accordance with an exemplary embodiment of the present invention is shown. Stand alone unit may be controlled from one or more central locations, of particular use for a network administrator or other such personnel following a user report. This may also be useful when users report issues the network administrator who may then immediately or otherwise extract data from nearby systems to help resolve the issue. By providing a network connection to the spectrum analyzer the user may no longer be required to be physically present to operate the system as the system may be operated remotely, either by a remote user, by remote software or the like. Multiple systems placed throughout a building or site may be connected together through a network. The user can operate the spectrum analyzer remotely as if he was physically present, or software could operate the spectrum analyzer(s) without a user being involved. All systems may stream data to a central unit suitable for analyzing and correlating data.

Figure 15:
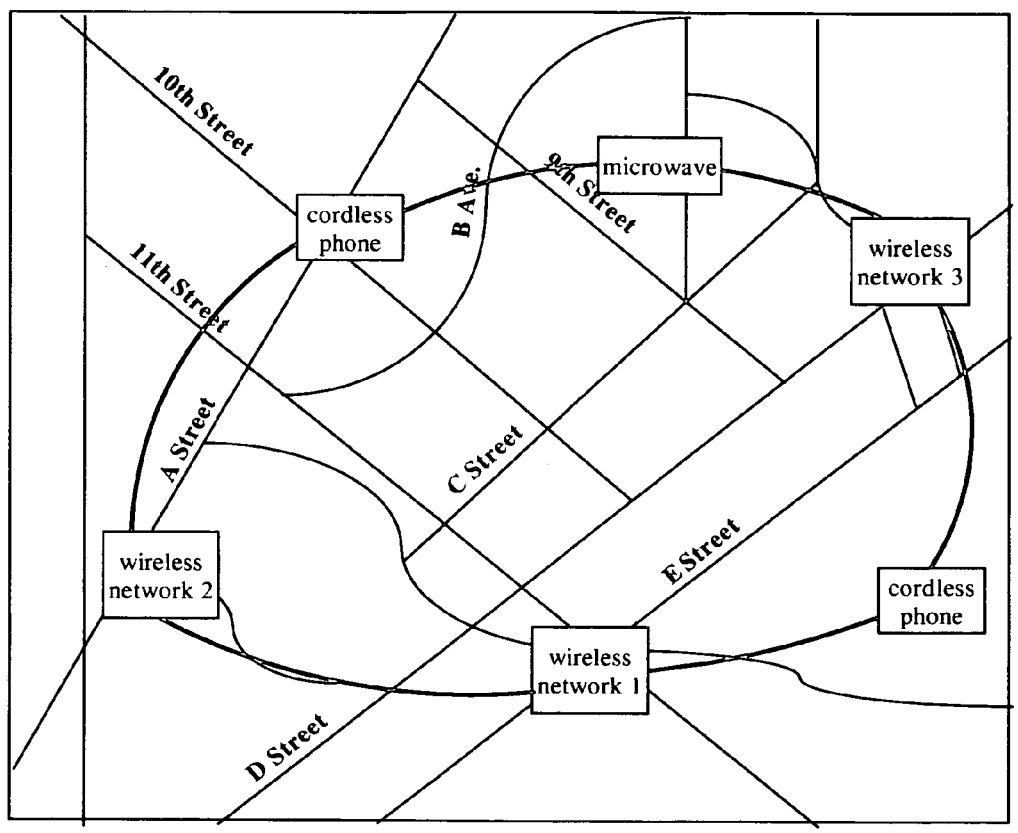
FIG. 15 is an illustration of a system in accordance with an exemplary embodiment of the present invention whereby wireless devices located in discrete geographic locations are identified.

System 400 may be suitable for locating and visually identifying the specific location of one or more wireless devices in a specific geographic region. Referring to FIG. 15, an illustration of a system 1500 in accordance with an exemplary embodiment of the present invention whereby wireless devices located in discrete geographic locations are identified is shown. Determining the type of device transmitting (or otherwise emitting) an RF signal may be accomplished by analyzing the spectrum analysis data and using a learning or adaptive algorithm to compare the current spectral information with previous information. When a device is identified, an image of the device type such as a wireless network device, a cordless phone, a microwave, and the like, may be displayed on the user interface to alert the user of the device. If the user mouses over the image additional information can be displayed such as how long the device has been active, what channel/frequency it is using, etc. Some of this information may also be overlaid onto the device image. For example, if a wireless device is identified on channel 11 an image of a wireless access point, a wireless network logo, or a like identifier may be displayed with the number "11" superimposed onto the image. If a pattern of RF activity cannot be identified, a recording of the RF activity may be transmitted, manually or automatically, to a server or other repository for identification. For instance, a recording may be transmitted to a website for further analysis.

Using systems connected together may provide analysis of all spectral data for an entire site. This information may detect traffic and patterns that may not be detectable when viewing the data from a single spectrum analyzer. Using either networked spectrum analyzers or a spectrum analyzer physically connected to the computer, a software (or hardware) program could analyze the spectrum analyzer data to look for abnormal or undesired RF activity. This activity could include unwanted device types, unidentifiable RF activity, or a higher-than-normal signal strength across the entire band or a specific channel. Alerts can be created by the user for specific activity types or the software could determine (based on analysis of previous RF activity of the site) if the RF activity is abnormal. If abnormal or undesired traffic is detected an alert could be sent using email, SMS, paging, etc. The alert could also trigger the data to be recorded for future playback and analysis. If the data is already being recorded the alert could trigger a special bookmark in the recording to allow the user to quickly jump to that section of the recording that contains the abnormal or undesired traffic. Specific triggers can be created to watch for specific activity.

System 400 may also be suitable for providing an audio output. Utilizing audio output as well as visual indication via a display, pop-up or the like to show the signal strength of a given channel or frequency range may allow a user to adjust antenna position and other activities related to relative signal strength of a channel, without continually looking at the display. The audio output may utilize the audio frequency to correspond to the frequency that is being monitored (in other words, low audio frequency for frequencies on the low end of the monitored band and high audio frequency for frequencies on the high end of the monitored band), and volume for amplitude. Arbitrary channel width for various devices (22 MHz for Wi-Fi, 3 MHz for Zigbee, etc). Average of the entire channel may be shown. Audio output corresponding to signal level may allow antenna positioning without looking at the computer screen.

System 400 may also comprise an integrated location determination system such as a global positioning system (GPS). For outdoor site surveys utilizing a system in accordance with an embodiment of the present invention, recording the location as well as the spectral data may provide a more complete post-analysis of the data after the site survey is conducted. GPS location data may be stored along with the spectrum analysis data in the recorded file. During playback of the file, a map of the location may be displayed with a marker indicating the location corresponding to the current time position of the recording. As the recording is played back, the marker may travel around the map, allowing correlation of the spectral data with the physical location. The complete physical path may also be displayed on the map. Physical path display may be accomplished via a colored line, dashed line, dotted line, and the like where the color or pattern represents the signal strength of a specific channel or frequency range at that location. A user may then select anywhere along the recorded path to automatically start playback of the recording from that physical location.

If device type identification is available, device images, information and the like regarding a device may be displayed at the identified location. GPS location coordinates may be stored in a recording. Recording playback may comprise a map having a marker showing location at the instance of the recording. A recording path may be illustrated on the map. Recording path may show aggregate or max signal strength at the point along the path. For instance, graphical user interface may display a. blue section of path to indicate a lower signal strength, a red section to indicate a higher signal strength, and the like. Clicking anywhere along the recording path may automatically bring a user to the corresponding section of the recording. Identified devices can be shown on the map at the location they were identified.

Figure 16:
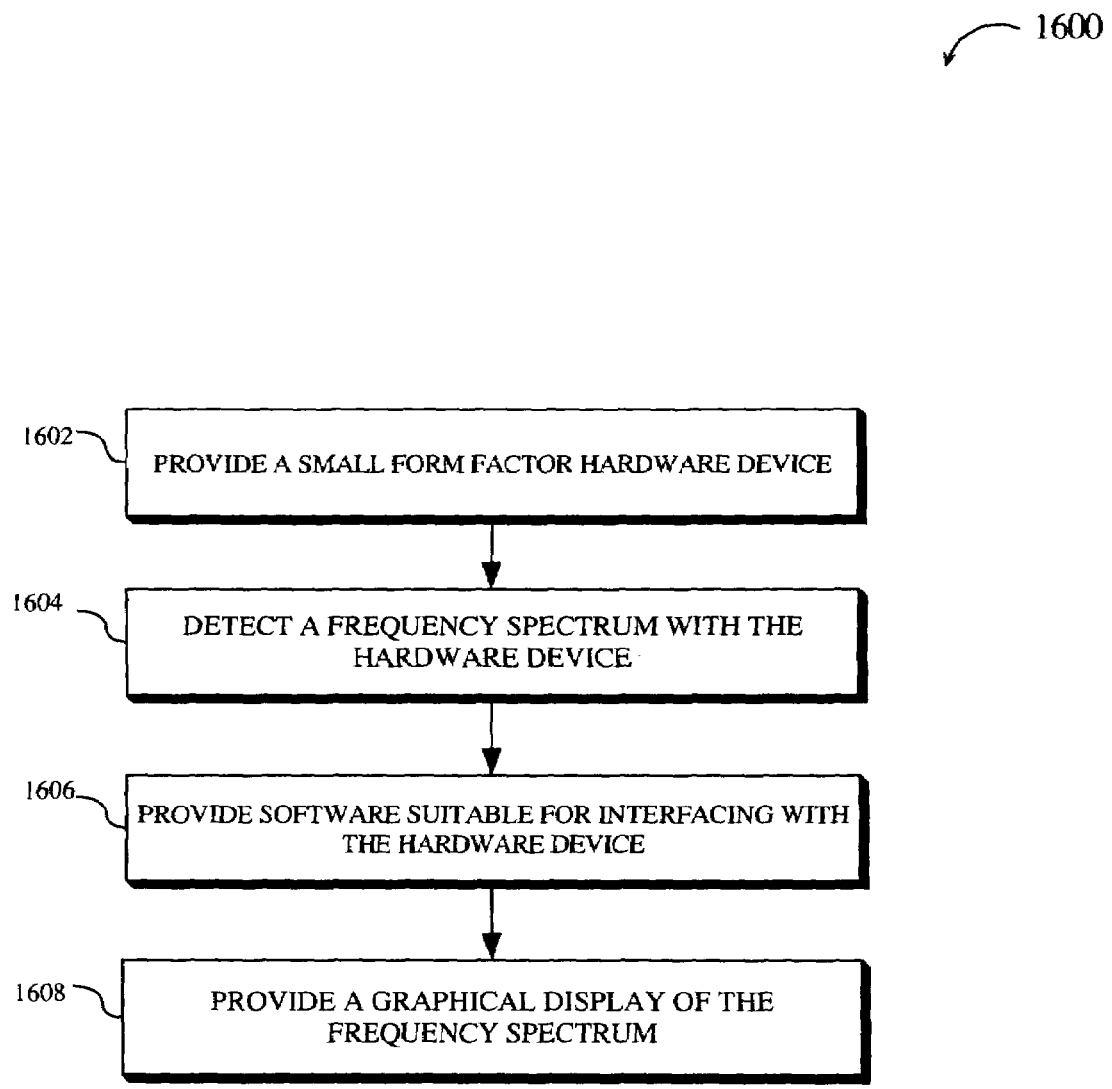
FIG. 16 is a flow diagram of a method of detecting and analyzing frequency spectrum data in accordance with an embodiment of the present invention.

Referring to FIG. 16, a flow diagram of a method 1600 of detecting and analyzing frequency spectrum data in accordance with an embodiment of the present invention is shown. Method 1600 may comprise providing a small form factor hardware device 1602. The hardware device may comprise a radio, a processing device and a memory, and may be suitable for detecting frequency spectrum data. Hardware device may be inserted into a port such as a USB 1.1, 2.0 or a like port and a system shortcut may be created. A user may select the system in, for example, Start→Programs→System. The system hardware device may enumerate as a generic USB Human Interface Device (HID), an no special drivers may be required. An initial insertion of a system hardware device into a computing device port may require a longer than usual enumeration. However, subsequent insertions may require a relatively short enumeration, as the computing devices more quickly recognizes the hardware device. It is further contemplated that no software configuration or registration may be required. Method may detect and analyze frequency spectrum activity 1604. Method 1600 may further comprise providing a display suitable for interfacing with the hardware device 1606. Method 1600 may comprise installing software suitable for providing the display. In one embodiment, files may be installed into a single folder in a directory such as a "Program Files" directory. A shortcut folder may be created in the folder containing one or more links to an executable file and user documentation. Upon installation, a user may select an option allowing all users of the computing device to access the system, or only a selected user. Installation may be via a CD-ROM containing installation files. Additionally, any requisite companion software, such as a redistributable version of the Microsoft .NET Framework 1.1 may be included with the system and may be installed if needed. Alternatively, method 1600 may only install the spectrum analyzer software, such as if a computing device already contains companion software. Method 1600 may also comprise displaying the detected frequency spectrum activity on a graphical user interface 1608. Upon enumeration completion, a visual indication, such as a green LED in a hardware device may illuminate, and an enumeration indicator on the graphical user interface may correspondingly illuminate.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the various embodiments of the present invention and many of their attendant advantages will be understood by the foregoing description, and it will be apparent that various changes may be made in the form, construction, and arrangement of the components thereof without departing from the scope and spirit of the embodiments of the invention or without sacrificing all of their material advantages. The form herein before described being merely an explanatory embodiment thereof, it is the intention of the following claims to encompass and include such changes.

What is claimed:

1. An apparatus for detecting, receiving and displaying wireless network information, comprising:
   a housing;
   a circuit board disposed within said housing, said circuit board further comprising:
   a radio, said radio consisting of a 2.4 GHz direct sequence spread spectrum (DSSS) radio system on a chip;
   a processing device and memory, said processing device comprising a highly integrated chip, said processing device further comprising a CPU, RAM, ROM, at least one I/O port and at least one timer;
   a wireless network detector; and
   a connector suitable for connecting with a port of a computing device, said connector consisting of a Universal Serial Bus (USB) connector interfacing with a USB port of a computing device;
   wherein said circuit board is a small form factor circuit board, said radio detects a frequency spectrum, said wireless network detector detects wireless network information, including at least one of signal strength, security type, or wireless network name, and said processing device transfers detected frequency spectrum data and said wireless network information to said computing device via said connector and interfaces with a display displaying a manipulatable graphical user interface for analyzing said detected frequency spectrum data and said wireless network information received from said processing device through said connector.

2. The apparatus of claim 1, wherein said memory stores said detected frequency spectrum data.

3. The apparatus of claim 1, further comprising a software application stored in said memory generating said display.

4. A system for detecting, receiving and displaying wireless network information, comprising:
   a portable hardware device, said portable hardware device further comprising:
   a housing;
   a circuit board disposed within said housing, said circuit board further comprising:
   a radio, said radio consisting of a 2.4 GHz direct sequence spread spectrum (DSSS) radio system on a chip;
   a processing device and a memory for storing measurement data, said processing device comprising a highly integrated chip, and said processing device further comprising a CPU, RAM, ROM, at least one I/O port and at least one timer;

a connector suitable for connecting with a port of a computing device, said connector consisting of a Universal Serial Bus (USB) connector interfacing with a USB port of a computing device;

the portable hardware device formed as a small form factor hardware device to detect a frequency spectrum, and transfer detected frequency spectrum data to said computing device via said connector; and a graphical user interface for displaying on a display of said computing device and interfacing with said portable hardware device and displaying, analyzing, and manipulating said detected frequency spectrum data received from said processing device through said connector.

5. The system of claim 4, wherein said graphical user interface records, saves and replays said detected frequency spectrum data.

6. The system of claim 4, wherein said graphical user interface displays amplitude versus channel.

7. The system of claim 4, wherein said portable hardware device detects a wireless network and said graphical user interface displays security type, signal strength or network name information for said wireless network.

8. The system of claim 4, further comprising an activity log for logging device traffic data and an activity graph displaying at least one of an average signal strength, a minimum signal strength or a maximum signal strength for a discrete time period.

9. The system of claim 4, wherein said portable hardware device detects a rogue access point and transmits an alert to at least one of said graphical user interface or a communication device via a pop-up message on said graphical user interface, an email, or an SMS message.

10. The system of claim 4, further comprising a database of prerecorded signals generated by at least one of a 2.4 GHz cordless phone, a microwave oven, a wireless file transfer, wireless streaming audio, or a Bluetooth signal.

11. The system of claim 4, wherein said display displays a spectrograph view of said detected frequency spectrum data, said spectrograph view configured to provide a bookmark function for bookmarking new device identification information and new device activity.

12. The system of claim 4, further comprising a location determination system determining a geographic location of a device operating in said frequency spectrum and correlating said detected frequency spectrum data with said device.

13. The system of claim 12, wherein said display generates a map and displays said geographic location of said device on said map.

14. A method comprising:

providing a small form factor hardware device for detecting frequency spectrum data;

detecting said frequency spectrum data;

providing a display interfacing with said small form factor hardware device and analyzing said detected frequency spectrum data; and displaying said detected frequency spectrum data; and manipulating said detected frequency spectrum data, said manipulating said frequency spectrum data further including:

recording a data trace of said detected frequency spectrum data;

saving said recorded data trace of said detected frequency spectrum data;

recording a subsequent data trace of said detected frequency spectrum data; and providing a toggle function to compare said data trace of said detected frequency spectrum data and said subsequent data trace of said detected frequency spectrum data.

15. The method of claim 14, wherein said small form factor hardware device further comprises a 2.4 GHz radio, a processing device, a memory and a USB connector connecting to a port of a computing device.

16. The method of claim 14, further comprising inserting said small form factor hardware device into a USB port of a computing device.

17. The method of claim 14, further comprising installing a software application for generating said display on said computing device.

* * * * *